R. LIEBAU.
FLUID PRESSURE DEVICE.
APPLICATION FILED FEB. 25, 1910. RENEWED FEB. 15, 1913.
1,071,446.
Patented Aug. 26, 1913.
2 SHEETS—SHEET 1.
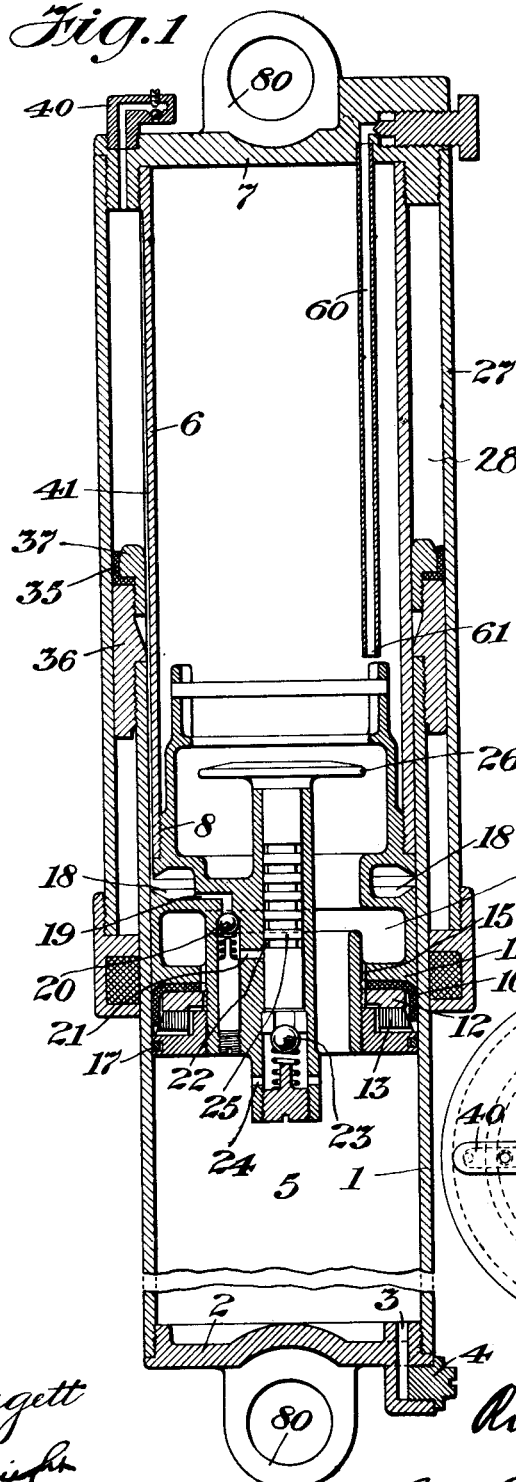
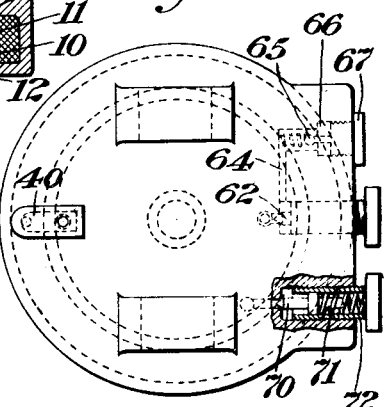

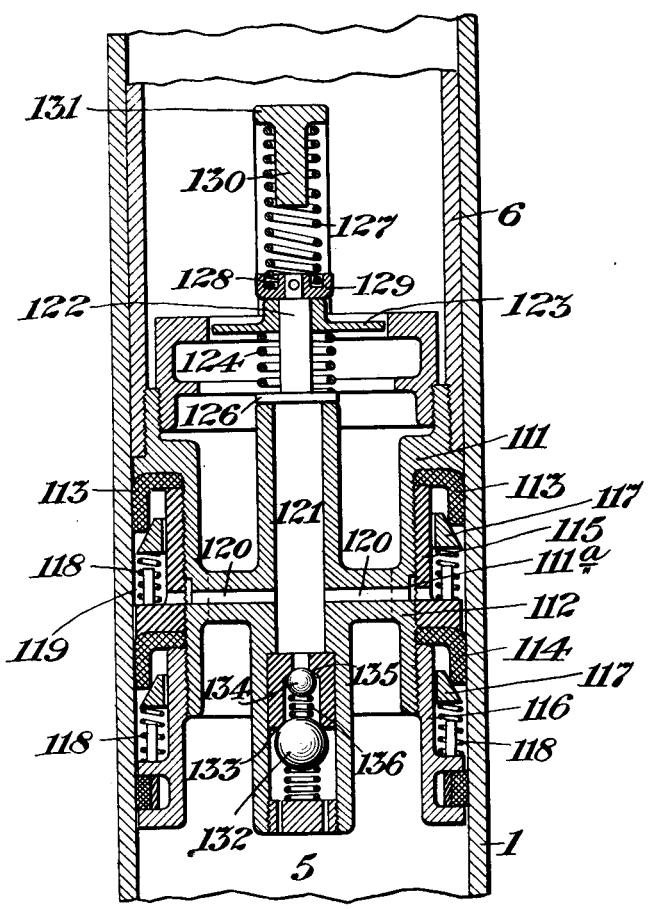

UNITED STATES PATENT OFFICE.

RICHARD LIEBAU, OF WATERVLIET, NEW YORK, ASSIGNOR TO THE WESTINGHOUSE AIR SPRING COMPANY, A CORPORATION OF PENNSYLVANIA.

FLUID-PRESSURE DEVICE.

1,071,446.   Specification of Letters Patent.   Patented Aug. 26, 1913.

Application filed February 25, 1910, Serial No. 545,956. Renewed February 15, 1913. Serial No. 748,707.

*To all whom it may concern:*

Be it known that I, RICHARD LIEBAU, a citizen of the United States, and resident of Watervliet, in the county of Albany and State of New York, have invented certain new and useful Improvements in Fluid-Pressure Devices, of which the following is a specification.

My present invention relates to certain improvements in devices set forth in an application of George Westinghouse Serial Number 520,039 filed September 28, 1909. It is also related to my application Serial Number 545,957 of even date herewith and it includes certain novel combinations somewhat analogous to those shown in the application of George Westinghouse, Serial Number 545,854 of even date herewith.

With respect to the general nature of the invention it may be said to resemble the inventions of the above mentioned applications insomuch as it is embodied in a fluid cushion device particularly adapted for use as a spring, which may be used in any relation where two bodies are so associated that resilient movement is desirable, and especially where one or the other of the bodies is subject to sudden movements, vibrations, or shocks which it is undesirable to have transmitted to the other of said bodies. Certain features relating to the packing and lubrication of the sliding joint of the cylinders are applicable in any relations where high pressures are to be sustained.

It will be understood that though capable of use in other relations, the invention has been devised primarily in connection with automobiles, and the general object in view has been to embody the principles of resilient support by means of an elastic-fluid cushion, such as air or gas in a practical, self-contained, air-tight device capable of movement for compression and extension and adapted to serve as a spring, but to combine therewith all the desirable features of a shock absorber, the entire device being adapted to meet the exacting conditions and to stand the rough usage required in connection with automobiles, delivery wagons, trucks, railway rolling stock, etc.

I prefer to make the device in the form of telescoping tubes with the smaller or inner tube uppermost. The tubes are hermetically closed at the outer ends and the inner tube is provided at the inner end with peripheral packing adapted to form a fluid tight joint, and is internally contracted to form a relatively constricted passage, so that the flow of liquid to and fro between the fixed volume space in the upper cylinder and the variable space in the lower cylinder, is more or less throttled. The fluid within the cylinder consists of a compressible medium such as air or other gas in the upper portion, and an incompressible medium, such as oil, glycerin, etc., filling the lower portion, preferably to a level above the packing. The throttling effect at the lower end of the plunger cylinder may be rendered asymmetric by means of a check valve adapted to remain normally open on the compression movement of the spring, but to cut off a desired portion of the passage upon the extension movement. The normal internal pressure of the fluid medium is preferably high, but for convenience in practical operation of an automobile, is preferably not higher than can be supplied by an efficient tire pump of the ordinary commercial type. In said applications referred to I have shown a pump adapted to remove fluid from the low pressure side of the packing for the sliding joint between the cylinder and plunger, and to force the fluid into the pressure cavity within the cylinder. The pump referred to is located inside of the cylinder and may be arranged so as to apply a certain degree of suction between the sliding surfaces of the two cylinders and this may serve in certain cases to pump air into the cylinder as well as to collect escaping oil. In cases where the pump is of a capacity adapted to produce increase of internal pressure, I may provide an adjustable relief valve adapted to permit escape of air when the internal pressure exceeds the desired value.

One of the objects of my present invention is to arrange an internal compression pump so that its compression or forcing strokes will be coincident with the extension movements of the relatively movable cylinder and plunger so that discharge of fluid into the pressure cavity within the device will take place at times when the internal pressure is considerably lessened and hence the work to be done by the pump will not be so great as where the forcing strokes of the pump are caused by compression movements of the members. It is obviously much easier to force material into the interior at or near the end of an extension movement than when the compression device is fully compressed under extreme load.

Another object of the invention is to arrange the inlet passage whereby fluid is removed from the low pressure side of the sliding joint so that the natural drainage due to gravity will be downward throughout the said passage and through the check valve cavities therein, as well as through the pump cavity where a pump is used. One of the check valves in such passage may be normally located below the level of the liquid within the device so that the valve is normally bathed in liquid and thereby prevented from leaking.

Another object of my invention is to arrange an internal pump operated by flow of fluid within the device so as to have its forcing stroke coincide with extension movements of the cylinder and plunger in combination with an external pump and an intermediate check valve in such manner that the external pump applies pressure to the low pressure side of the sliding joint on compression movements of the device so that the forcing movements of the external pump alternate with the forcing movements of the internal pump.

The internal pump having its forcing stroke coincident with the extension movements of the device may have its intake on the low pressure side of the main packing or between two packings and where two packings and a collecting groove are employed the upper packing may be a cup leather arranged to scrape oil into the collecting groove.

In the drawings Figure 1 is a vertical axial section through one form of my device. Fig. 2 is a top plan view of the same. Fig. 3 is a detailed view of a modified form of plunger head containing my invention.

The lower cylinder is hermetically closed at the bottom by a screw head 2 which is formed with a drain passage 3 normally closed by screw plug 4. The cylinder 1 provides a variable space 5 which is adapted to be increased or decreased by up or down movements of the plunger cylinder 6. The latter is provided on the upper end with the screw closure 7. The lower end is screw threaded at 8 to a plunger head provided with an external packing and an internally constricted fluid passage. The packing consists of a cup leather 10 clamped against seat 11 by means of an annular ring 12. The free edge of the cup leather is preferably cut square and is held in close engagement with the inner walls of the cylinder by means of a cone expanding ring 13. The annular space adjacent the free edge of the cup leather 10 including the space containing the expanding ring 13 is supplied with oil from the annular reservoir 14 by duct 15 passing downward in the rear of seat 11 cup leather 10 clamping ring 12 and cone ring 13. There may be a number of these ducts providing a continuous supply of oil within the space adjacent the cup leather where it is held by means of the supplemental packing 17 arranged below said main packing.

My pump arranged for expelling fluid into the interior during times of diminishing internal pressure is mounted upon the plunger head in operative relation to the constricted path of fluid flow therethrough. This pump has an intake in an annular collecting groove 18 adapted to collect surplus oil from the sliding joint on the rear side of the cup leather packing. The intake 19 leads downward to valve 20, thence through passage 21 to the pump cavity 22 thence downward through valve 23 to the exit openings 24 within the pressure cavity of the device. The valves are ball valves, spring pressed upwardly as shown in the drawings, and the path of the entire passage is such that there is no up-turn where liquid would have to move against the force of gravity. The proportion of parts is preferably such as to bring the lower ball valve 23 low enough so that it is normally submerged in the oil within the device.

By reference to the drawing it will be seen that the pump piston 25 is somewhat similar to piston shown in the other internal pumps of the applications above referred to, but the arrangement thereof is different in that the piston stem extends upwardly from the pump cavity and has rigidly secured thereto the disk 26 which in the present case serves the function of an asymmetric check valve adapted to permit relatively free flow of fluid on the compression movements of the device and to restrict the flow to a predetermined degree upon extension movements thereby preventing the excessive recoil which occurs when no special means for preventing recoil is employed. This arrangement of the piston and fluid actuated disk causes the piston to make its upward or suction stroke during compression movements of the device and its downward stroke during the recoil or extension movements thereof, so that the time of discharge of fluid into the device coincides with times of decreasing internal pressure. There being no upwardly directed passages in the path of fluid flow between inlet and outlet of the pump, the liquid part of the fluid medium handled thereby would tend to settle into the inlet of each valve and of the pump cavity. From this it results that the valves of the pump piston will be sealed by the oil and the tendency will be to pump oil first and then air.

My internal pump operating as above described may be used alone or if desired it may be used in connection with an external pump such as shown in the application of George Westinghouse, Serial No. 545,854 of even date herewith. In the latter case I may arrange an outer or guard cylinder 27 rigidly connected with plunger cylinder 6 and spaced apart therefrom so as to form an annular compression space 28, the upper end of the compression cylinder being utilized as an annular piston for compressing the air within said space. The packing for this annular piston consists of a cup leather 35 bearing against the outer cylinder 27 and clamped between a screw ring 36, screwed on to the upper end of cylinder 1 and a clamping ring 37 screwed to ring 36. An in-let check valve conventionally indicated at 40 is arranged on the cylinder head 7. With this arrangement extension movements of the spring serve to draw in air through the check valve, while return movement compresses it, and when the movement is sufficient to produce a sufficient compression the air escapes downward through the joint between the annular ring 36 and the adjacent wall of cylinder 6. This raises the pressure on the rear side of the sliding joint thereby tending to force oil or air or both downward through the valve 20.

As the fit of the sliding joint is usually very perfect I prefer to provide the outer surface of cylinder 6 with one or more vertical grooves 41, communicating with the annular collecting groove 18. In the above described arrangement the external pump coöperates with the internal pump and intermediate valve 20 so as to give a two-stage compression operation and the final compression serves to discharge the fluid into the compression space within the device during times of decreasing pressure therein in the following manner. Air is drawn in through valve 40 during any sufficiently long extension movement of the device and is compressed by the succeeding compression movement. It will be noted that during such compression movement the piston of the internal pump will be drawn upwardly by flow of fluid against the under side of disk 26, thereby uncovering inlet passage 21. The pressure from the external pump taking effect through groove 41 serves to raise the pressure in the collecting groove 18 and in case there is any oil collected in the bottom of said groove to force it into the intake 19 of the pump and down through valve 20, thus raising the pressure in the valve chamber, passage 21 and in the pump cavity when passage 21 is uncovered by the piston, the degree of pressure being dependent upon the amplitude of the movements. The pump piston being actuated by fluid flow, begins its forcing movement as soon as the recoil or extension movement of the device starts downward flow from the upper cylinder 6 into the variable compression space 5. This closes the passage 21 at the instant the pressure from the outside pump begins to fall off. The downward or forcing movement of the pump piston is completed as soon as the violence of downward flow of fluid in the device is sufficient to overcome the internal pressure which decreases as the recoil or extension movement progresses.

The arrangements for charging the device with oil and compressed air are preferably located in head 7 of cylinder 6. As shown in Fig. 1, an inlet tube 60 extends down a desired distance, so that its outlet orifice 61 is at or about the desired level of the liquid to be used. The passage of air or liquid through this tube is controlled by a needle valve indicated at 62. As indicated in Fig. 2, there is a passage 64 leading from the needle valve chamber to an inlet check valve 65, which communicates with a screw threaded opening 66, to which may be connected supply pipes for oil or compressed air. In charging the device oil may be introduced either by removing needle valve 62 and substituting an oil supply pipe, or needle valve 62 may be merely loosened and the oil supplied through the opening 66 and check valve 65. After oil has been charged into the device to a suitable height, which is preferably above the level of the orifice 61 of pipe 60, the compressed air is introduced through 66, 65, 64, 60, until the internal pressure is sufficient to support the desired load with the parts approximately in the position indicated at Fig. 1. The air supply is then detached and surplus oil blown out through pipe 60, until the escape of air indicates that its orifice has been uncovered by lowering of the level of the liquid. The needle valve 62 and the plug 67 are then screwed tight and the device is in condition for use.

Where the pumping capacity of the pump described above is sufficient to raise the internal pressure of the device, undue raise of pressure may be prevented by an automatic relief valve, which is diagrammatically indicated in Fig. 2 as comprising a plug valve 70, closing spring 71, and screw adjusting means 72 for adjusting the initial pressure of the spring to thereby predetermine the maximum internal pressure, which may be maintained in the device. The above described device is provided at both ends with journals 80, 80, adapted to engage pivots of a universal joint comprising pivots arranged at right angles to each other and a coöperating bracket attached to one of the members to be cushioned by said device.

In Fig. 3 I have shown a modified arrangement which differs from that of Fig. 1 in that the valve disk is free to slide on the pump stem, two valves are used in sequence below the pump piston in the exit passage thereof and the downward movements of the piston are assisted by a spring. The advantage in using such a spring is that the more violent upward flow of fluid on the compression movement of the device may be used to store up energy by compressing the spring so that such energy may be available to assist the downward flow of fluid in forcing the expelling movement of the pump piston, during recoil or extension movements of the device. In said Fig. 3 the main cylinders 1 and 6 and the external parts connected therewith may be the same as shown in Figs. 1 and 2, the object being to illustrate the modified arrangement of the plunger head, pump stem and valve disk. The plunger head 111 is screw threaded to the lower end of cylinder 6 and is formed with a downward extension 112 having suitable packings secured upon the screw threaded exterior thereof and affording interiorly a constricted passage for flow of the fluid to and fro between the variable volume space 5 in cylinder 1 and a fixed volume space in cylinder 6. As shown there are two main packings and a supplemental packing. The main packings are similar and comprise cup leathers 113, 114 held against suitable seats by clamping rings 115, 116 respectively. The free edges of the cup leathers are preferably cut square and are held in close engagement with the wall of the outer cylinder by means of cone expanding rings 117, 117 spring pressed in a direction parallel to the axis of the device so as to afford a wedging expanding action upon the interior edges of the cup leathers. The yielding spring pressure for these rings is preferably provided by a series of small springs 118, 118 distributed at suitable points about the periphery. These give an even pressure at all points about the circumference. The upper cup leather 113 serves to wipe surplus oil from the walls of the cylinder and to collect the same within the annular collecting groove 119, whence it may be drawn through symmetrically arranged ducts 120, 120 into the pump cavity whenever the piston 121 is withdrawn sufficiently to uncover said ducts. A circumferential groove 111ª is formed in the outer surface of plunger head 111 so that the outer and inner sections of ducts 120 will be in communication whatever may be their angular relation when clamping ring 115 is screwed tight against cup leather 113.

The upwardly extending piston stem 122 carries the valve disk 123 which is capable of relative movement along said stem but which normally tends to remain in the uppermost position by reason of the action of spring 124 which is interposed between said disk and a collar 126 on the pump stem.

The pump piston is normally subject to the downward pressure of spring 127 seated in groove 128 in the block 129 secured to the end of the pump stem. The spring is secured at the upper end by encircling a downwardly projecting seat 130 on bridge 131. The exit passage from the pump cavity is closed by a double ball valve consisting of lower ball 132 spring pressed upwardly against seat 133 and a second smaller ball 134 spring pressed upwardly against seat 135 by means of spring 136 resting upon the lower ball 132. This double valve affords double security against escape of fluid from the pressure cavity of the device.

It will be understood that the springs 124 and 127 for the pump stem and valve disk may be selected to suit the conditions and if desired may be made so light as to afford little or not obstruction to the movements of either pump stem or disk. In the latter case they will serve merely to cause the parts to tend to seek the position shown in Fig. 3 when not displaced therefrom by fluid flow and other forces acting thereon.

Various features of my invention are adapted for use in other relations where the conditions and functions to be served are similar, as, for instance, in other devices wherein a sliding joint is required to sustain great pressures without leaking; also they may be used as a supplement to or substitute for and may be supplemented or substituted by features set forth in the application of Richard Liebau, Serial No. 468,762, filed December 22nd, 1908.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. A cushion device, comprising relatively movable members forming a closed chamber, in combination with an internal compression pump having a compression chamber carried by one of said movable members, and a piston having its strokes coincident with the extension movements of said relatively movable members.

2. A cushion device comprising relatively movable members forming a closed chamber, in combination with an internal pump having a compression chamber carried by one of said movable members, and a piston operated by power derived through relative movement of said members and arranged to decrease the fall of pressure within said closed chamber coincident with periods of decreased pressure therein.

3. A cushion device comprising a cylinder and a plunger adapted for relative movement, in combination with an internal pump having a cylinder carried by the plunger, and a piston operated by power derived through relative movement of said plunger and cylinder and arranged to increase the pressure within the pressure cavity of said device during the extension movements of said cylinder and plunger.

4. A cushion device comprising a cylinder and a plunger adapted for relative movement, in combination with an internal pump arranged to increase the pressure within the pressure cavity of said device at times of decreasing pressure therein.

5. A cushion device comprising relatively movable members forming a closed chamber, in combination with an internal compression pump arranged to discharge fluid into said chamber, and automatic means operated by flow of liquid within the device for causing said pump to discharge coincidently with times of decreasing pressure in said chamber.

6. A cushion device comprising relatively movable members forming a closed chamber, in combination with a compression pump and non-positive automatic means operated by the flow of fluid resulting from compression and extension movements of said relatively movable members for discharging fluid into said chamber automatically and coincidently with the times of decreasing pressure therein.

7. The combination with members having a sliding joint therebetween and forming a chambered device capable of movement for compression and extension, of liquid and gaseous fluids within the chamber, and a pump within said chamber for transferring liquid from said joint to said chamber arranged to discharge during the extension movements of the device.

8. A cushion device comprising relatively movable members forming a chamber and having a sliding joint therebetween to permit variation of the volumetric capacity thereof, liquid and gaseous fluids within said chamber, and means for automatically forcing escaped fluid into said chamber during the extension movements of the device.

9. A cushion device comprising relatively movable members forming a chamber and having a sliding joint therebetween to permit variation of the volumetric capacity thereof, liquid and gaseous fluids within said chamber, and means for forcibly returning the escaped fluid into said chamber during the extension movements of the device.

10. A cushion device comprising in combination, two cylinders concentrically arranged and secured to a head member, a cylinder provided with one closed end and arranged to slide between said two cylinders, a packing for the sliding joint between the inner of said two cylinders, and a pump within the chamber formed by said two inner cylinders for applying suction to said sliding joint on the rear or low pressure side of said packing, and means for causing said pump to discharge during the extension movements of the device.

11. In a cushion device telescopic cylinders, a packing for the sliding joint between said cylinders, a compressible fluid within said cylinders, sealing liquid for said joint, and a pump adapted to withdraw liquid from the low pressure side of said packing and to force the same into the interior of said device during the extension strokes of said cylinders.

Signed at New York in the county of New York and State of New York this 14th day of February A. D. 1910.

RICHARD LIEBAU.

Witnesses:
 GEORGE C. DEAN,
 IRVING M. OBRIEGHT.